United States Patent
Wang et al.

(10) Patent No.: US 9,551,847 B2
(45) Date of Patent: Jan. 24, 2017

(54) LATCH MECHANISM FOR COMMUNICATION MODULE

(71) Applicant: FINISAR CORPORATION, Sunnyvale, CA (US)

(72) Inventors: William H. Wang, Pleasanton, CA (US); Shamei Shi, Shanghai (CN); Eric Li, Xi'an (CN)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/632,039

(22) Filed: Feb. 26, 2015

(65) Prior Publication Data

US 2015/0241646 A1    Aug. 27, 2015

Related U.S. Application Data

(60) Provisional application No. 61/945,701, filed on Feb. 27, 2014.

(51) Int. Cl.
*G02B 6/36* (2006.01)
*G02B 6/42* (2006.01)

(52) U.S. Cl.
CPC ............ *G02B 6/423* (2013.01); *G02B 6/4246* (2013.01); *G02B 6/4256* (2013.01); *G02B 6/4261* (2013.01); *G02B 6/4292* (2013.01); *Y10T 24/45492* (2015.01)

(58) Field of Classification Search
CPC ..... G02B 6/4292; G02B 6/423; G02B 6/4256; G02B 6/4231; G02B 6/4261; H01R 13/6273; H01R 13/6275; H01R 13/6277; H01R 13/6278; H01R 13/629; H01R 13/62927; H01R 3/62933; H01R 13/62955

USPC ............ 385/14, 53, 83, 88, 89, 92, 134, 139
See application file for complete search history.

(56) References Cited

U.S. PATENT DOCUMENTS

| | | | |
|---|---|---|---|
| 4,586,766 A * | 5/1986 | Hofmeister | H01R 13/62933 439/160 |
| 7,347,711 B1 | 3/2008 | Bianchini et al. | |
| 9,146,366 B2 * | 9/2015 | Koutrokois | G02B 6/4246 |
| 2006/0140552 A1 * | 6/2006 | Mizue | G02B 6/4292 385/92 |
| 2008/0089649 A1 | 4/2008 | Wang | |
| 2008/0310136 A1 * | 12/2008 | Huang | G02B 6/4292 361/801 |
| 2009/0211801 A1 | 8/2009 | Edwards et al. | |
| 2010/0175231 A1 * | 7/2010 | Lux | H02B 1/052 24/593.1 |
| 2012/0106902 A1 | 5/2012 | Thirugnanam et al. | |

OTHER PUBLICATIONS

International Search Report and Written Opinion issued in PCT Application No. PCT/US2015/017922 on Jun. 9, 2015, 9 pgs.

* cited by examiner

*Primary Examiner* — Kaveh C Kianni
*Assistant Examiner* — Hung Lam
(74) *Attorney, Agent, or Firm* — Maschoff Brennan (57) ABSTRACT

A latch may include a follower and a driver. The follower may include a follower opening configured to receive a post of a housing. The driver may include a driver opening configured to receive the post of the housing such that the driver is selectively rotatable relative to the post. The driver may further include an interfacing finger positioned to be received by the follower opening. The interfacing finger may be configured to urge the follower to slidingly move relative to the housing as the driver is rotated relative to the post.

18 Claims, 7 Drawing Sheets

Fig. 2F

LATCH MECHANISM FOR COMMUNICATION MODULE

CROSS-REFERENCE TO RELATED APPLICATIONS

This application claims priority to U.S. Provisional Application 61/945,701, filed Feb. 27, 2014, titled LATCH MECHANISM FOR COMMUNICATION MODULE, which is incorporated herein by reference in its entirety.

BACKGROUND

Field

The embodiments discussed herein relate generally to communication modules. More particularly, example embodiments relate to latch mechanisms for selectively engaging communication modules with a housing of a host device.

Relevant Technology

Communication modules, such as electronic or optoelectronic transceiver or transponder modules, are increasingly used in electronic and optoelectronic communication. Some modules are pluggable, which permits the module to be inserted into and removed from a housing of a host device, such as a host computer, switching hub, network router, or switch box. Latching mechanisms within the housing of the host device may be made to physically secure an inserted communication module into place. To remove the communication module, the latching mechanism may be manipulated to physically unsecure the communication module.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

The embodiments discussed herein may generally relate to latch mechanisms for communication modules.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

According to at least one embodiment, a latch may include a follower and a driver. The follower may include a follower opening configured to receive a post of a housing. The driver may include a driver opening configured to receive the post of the housing such that the driver is selectively rotatable relative to the post. The driver may further include an interfacing finger positioned to be received by the follower opening. The interfacing finger may be configured to urge the follower to slidingly move relative to the housing as the driver is rotated relative to the post.

According to another embodiment, a module may include a housing, a follower, and a driver. The housing may include a post. The follower may include a follower opening shaped to slide relative to the post as the follower slides relative to the housing. The driver may include a driver opening shaped to rotate relative to the post as the driver is rotated between a latched position and an unlatched position. The driver may further include an interfacing finger positioned to be received by the follower opening. The interfacing finger may be configured to urge the follower to a latched position relative to the housing as the driver is rotated from the unlatched position to the latched position. The interfacing finger may be further configured to urge the follower to an unlatched position relative to the housing as the driver is rotated from the latched position to the unlatched position.

According to another embodiment, a module may include a housing, a follower, and a driver. The housing may include posts, channels and depressions. The follower may include follower arms, follower openings, and a detent protuberance. The follower arms may each include an unlatch projection. The follower openings may be sized and positioned to receive the posts of the housing and to slide relative to the posts as the follower slides relative to the housing. Then driver may include driver arms, interfacing fingers, and a detent projection. The driver arms may each include driver openings sized and positioned to receive the posts and to rotate relative to the posts as the driver is rotated between a latched position and an unlatched position. The interfacing fingers may be positioned to be received by the follower openings of the follower and the channels of the housing. The interfacing fingers may be sized and positioned to urge the follower to a latched position relative to the housing as the driver is rotated from its unlatched position to its latched position. The interfacing fingers may further urge the follower to an unlatched position relative to the housing as the driver is rotated from its latched position to its unlatched position. The detent projection and the detent protuberance may be positioned such that the detent projection is resiliently deformed to create a resistance to be overcome to rotate the driver from the latched position to the unlatched position.

Additional features and advantages will be set forth in the description that follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are, therefore, not to be considered limiting of its scope. The invention will be described and explained with additional specificity and detail through the use of the accompanying drawings in which.

DESCRIPTION OF EMBODIMENTS

Example embodiments relate to latch mechanisms for selectively engaging communication modules with host devices. Example embodiments also relate to communication modules that include latch mechanisms for selectively engaging the communication modules with host devices. Embodiments described herein may include fewer parts and/or less complex parts, and may allow for simplified assembly compared to traditional latch mechanisms. Furthermore, components of the latch mechanism may be manufactured via less complex, less expensive, and/or less time-consuming manufacturing processes relative to traditional latch mechanisms. For at least these reasons, some embodiments may be less expensive and/or less expensive to implement relative to traditional latch mechanisms.

Reference will now be made to the drawings wherein like structures will be provided with like reference designations. It should be understood that the drawings are diagrammatic and schematic representations of example embodiments and, accordingly, are not limiting of the scope of the present invention, nor are the drawings necessarily drawn to scale. Many of the features of the disclosed embodiments may be substantially symmetrical and/or may be arranged symmetrically and a pluralized reference to a feature may refer to a pair of similar features of which only one may be labeled in the drawings.

1. Example Host Device and Communications Module

Figure 1:
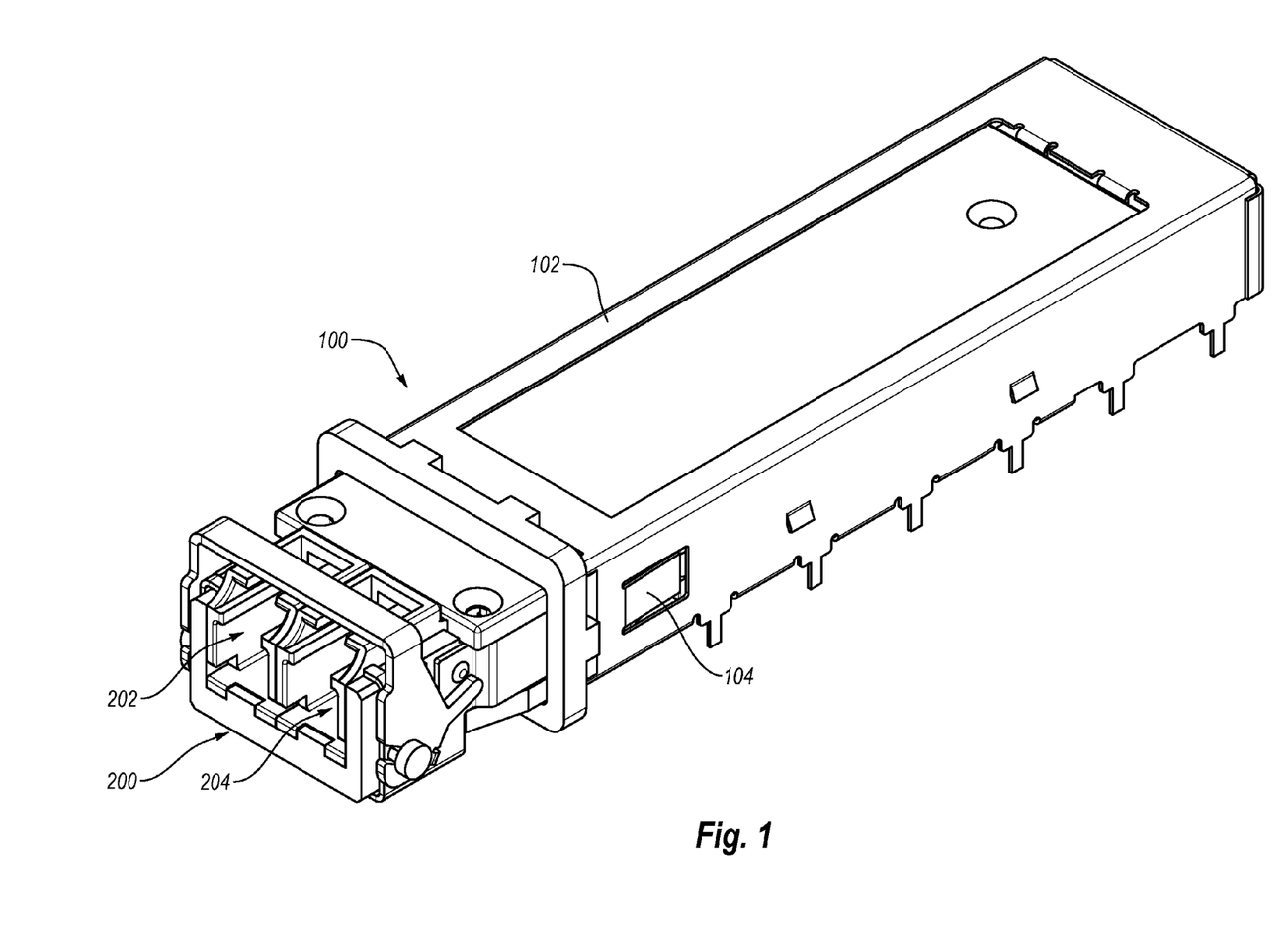
FIG. 1 is a top perspective view of portions of an example host device with an example optoelectronic module in a latched configuration located partially inside the example host device.

FIG. 1 is a top perspective view of portions of an example host device 100 with an example optoelectronic module 200 in a latched configuration located at least partially inside the host device 100. In general, the optoelectronic module 200 may be employed in the communication of optical signals and the conversion of optical signals to and from electrical signals. In connection, the host device 100 may be employed in the communication of corresponding electrical signals.

The optoelectronic module 200 may include a transmit port 202 and a receive port 204 at a front of the optoelectronic module 200. The optoelectronic module 200 may be configured for optical signal transmission and reception via the transmit port 202 and the receive port 204 at a variety of data rates including, but not limited to, 1.25 Gb/s, 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s or higher.

The optoelectronic module 200 may be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. The optoelectronic module 200 may be configured to support various communication protocols including, but not limited to, Optical Fast Ethernet, Optical Gigabit Ethernet, 10 Gigabit Ethernet, and 1×, 2×, 4×, 8×, and 16× Fibre Channel.

In addition, although one example of the optoelectronic module 200 is configured to have a form factor that is substantially compliant with the XFP MSA, the optoelectronic module 200 may alternatively be configured in a variety of different form factors that are substantially compliant with other MSAs including, but not limited to, the QSFP MSA, the QSFP+MSA, the CFP MSA, the CFP2 MSA, the CFP4 MSA, the SFP MSA, or the SFP+MSA. Finally, although the optoelectronic module 200 is illustrated as a pluggable optoelectronic transceiver module, example embodiments of the latching mechanism disclosed herein may alternatively be employed, for example, in connection with pluggable electronic transceiver modules, other pluggable electronic devices such as pluggable media drives, or the like.

The host device 100 may include a host device cage 102 configured to be connected to a host printed circuit board (not shown). The host device cage 102 at least partially receives the optoelectronic module 200. The host device cage 102 includes a pair of cage latches 104 located on opposite sides of the host device cage 102. The cage latches 104 may be formed as inwardly-biased leaf springs. Although the cage latches 104 are inwardly biased, the cage latches 104 may not substantially impede the insertion of the optoelectronic module 200 into the host device cage 102. The cage latches 104 extend away from the front of the host device cage 102 where the optoelectronic module 200 is received. The host device 100 generally forms an electrical connection to the optoelectronic module 200 through which electrical signals may be communicated between the host device 100 and the optoelectronic module 200.

Figure 2A:
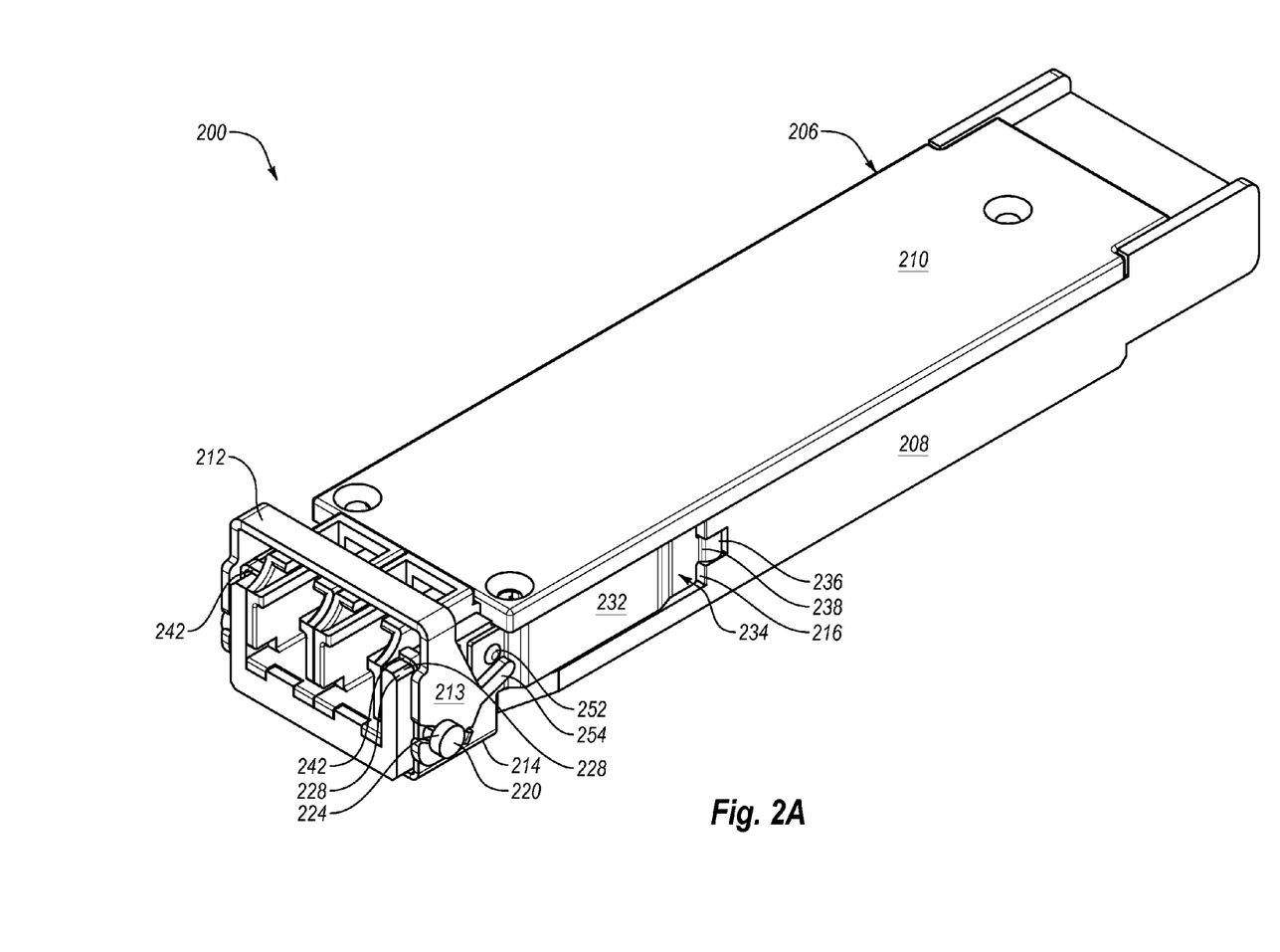
FIG. 2A is a top perspective view of the example optoelectronic module of FIG. 1 in the latched configuration with the example host device omitted.
Figure 2B:
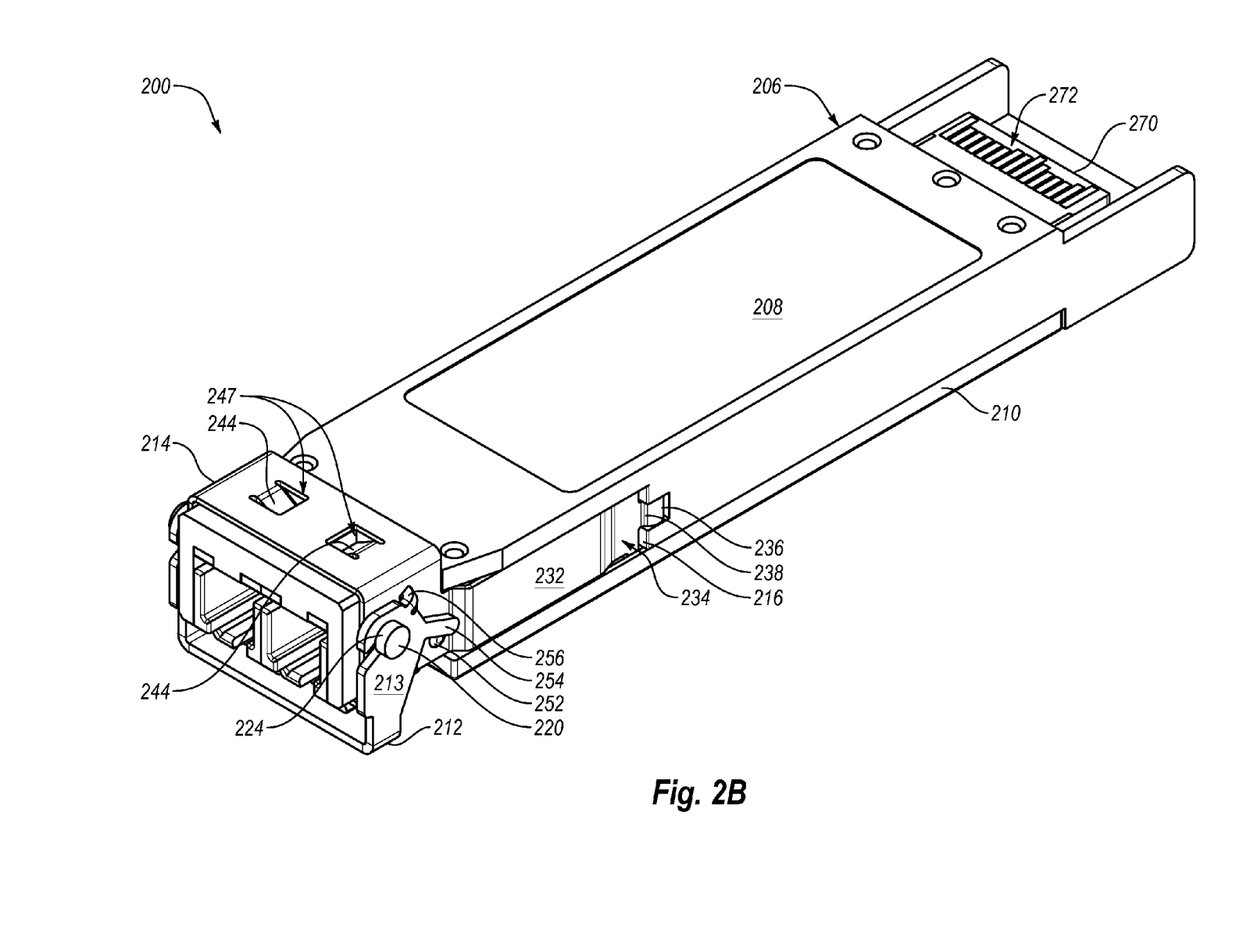
FIG. 2B is a bottom perspective view of the example optoelectronic module of FIG. 2A in the latched configuration.
Figure 2C:
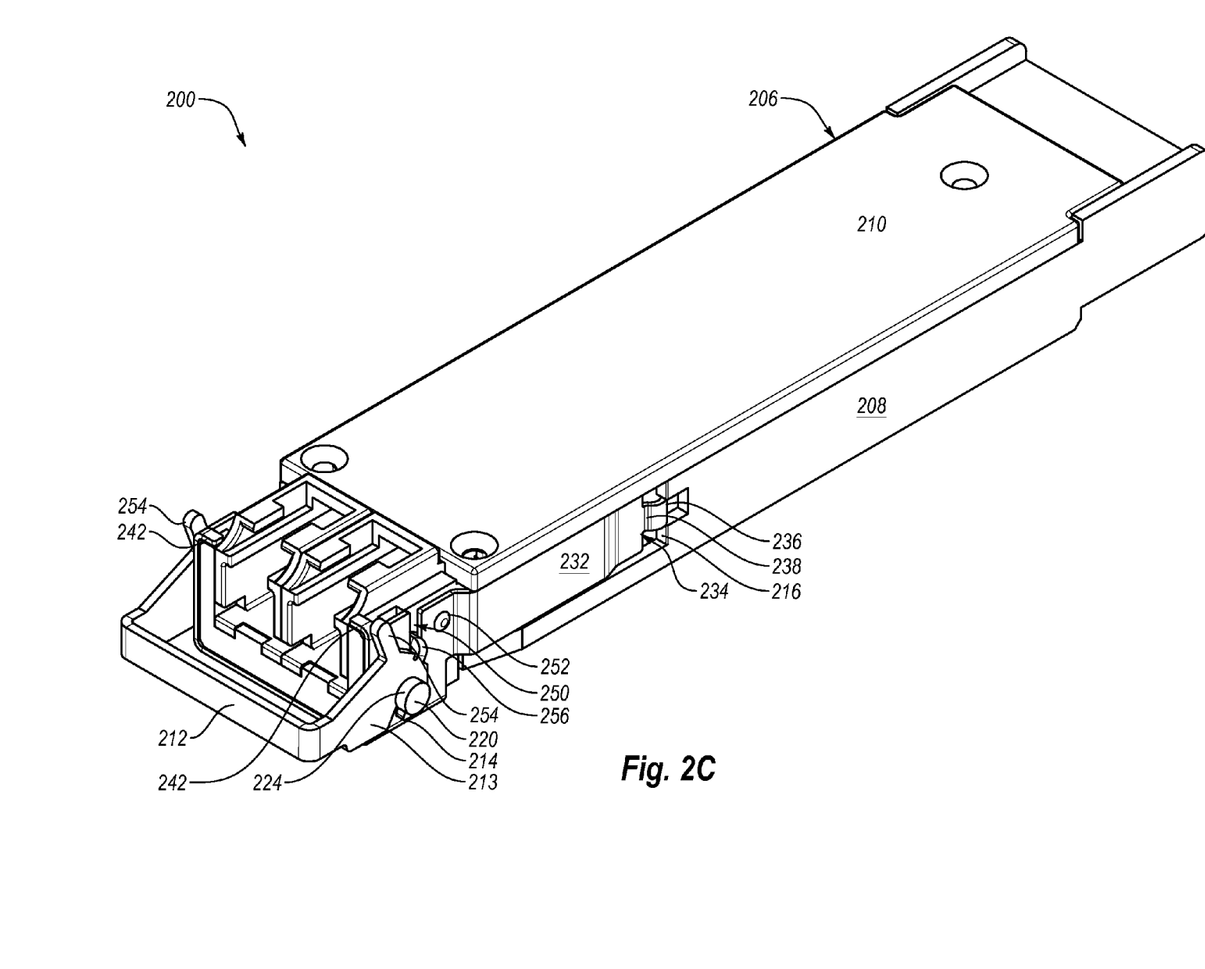
FIG. 2C is a top perspective view of the example optoelectronic module of FIG. 2A in an unlatched configuration.
Figure 2D:
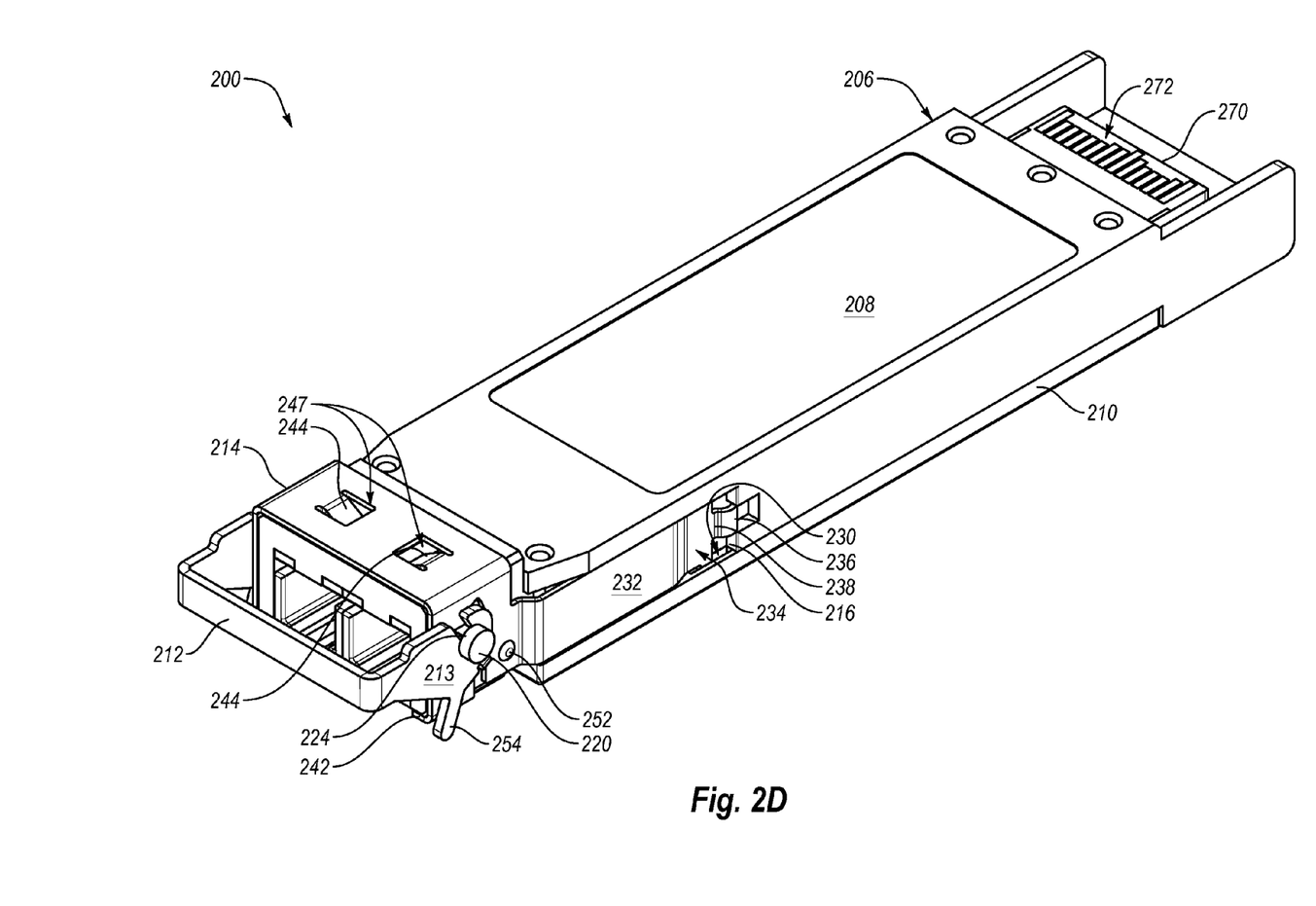
FIG. 2D is a bottom perspective view of the example optoelectronic module of FIG. 2A in the unlatched configuration.
Figure 2E:
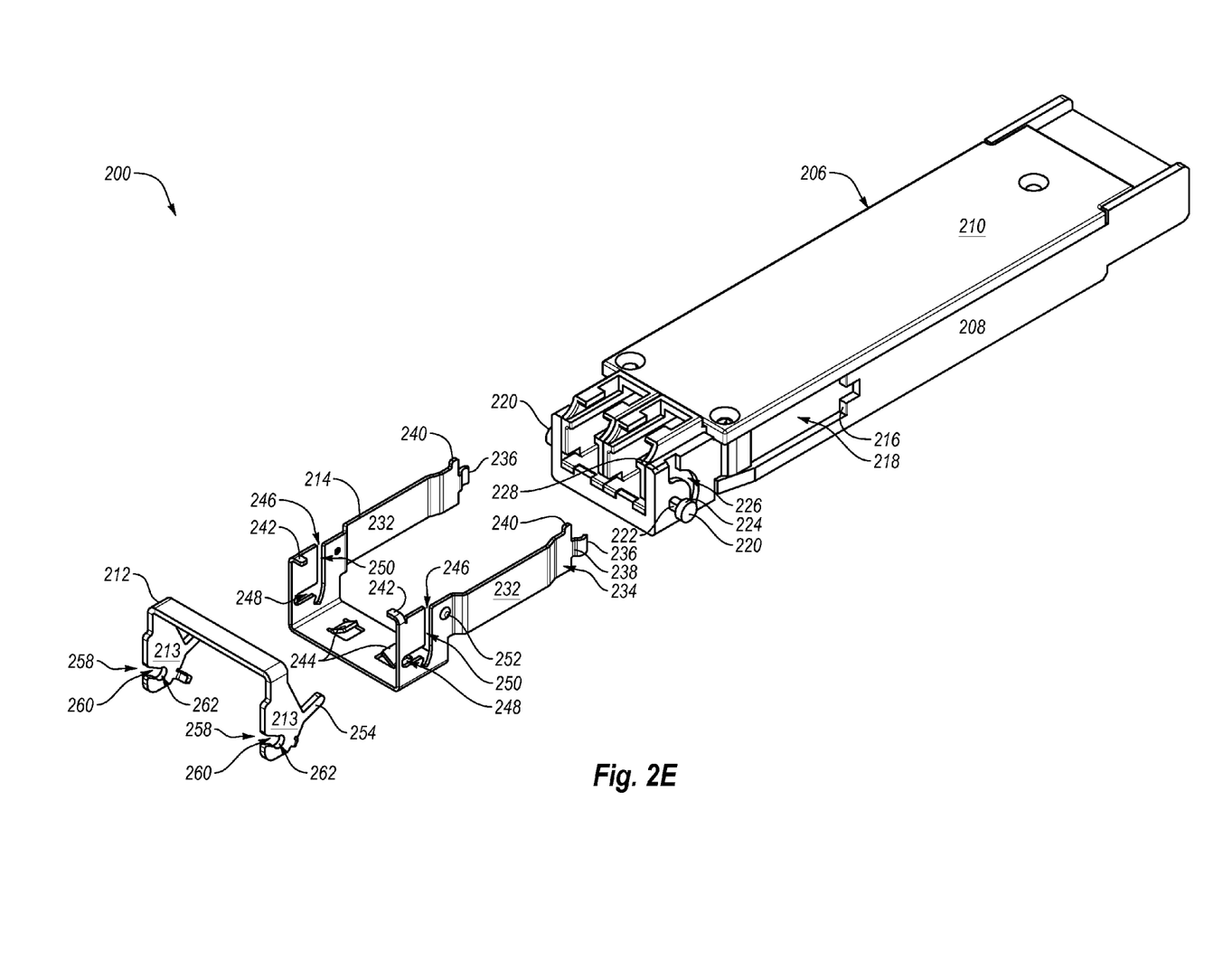
FIG. 2E is an exploded top perspective view of the example optoelectronic module of FIG. 2A.
Figure 2F:
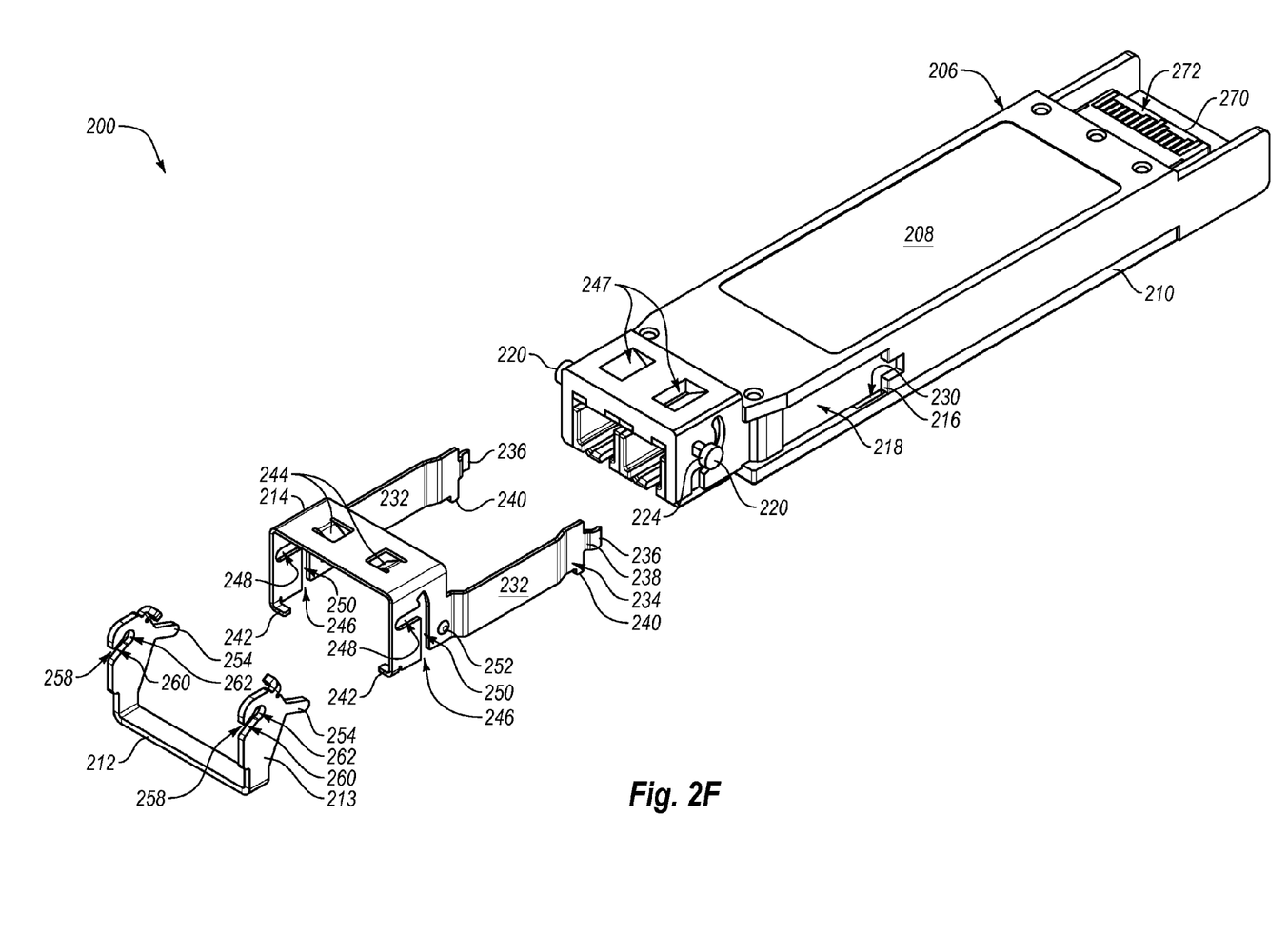
FIG. 2F is an exploded bottom perspective view of the example optoelectronic module of FIG. 2A.

FIGS. 2A-2F are various views of the example optoelectronic module 200 of FIG. 1 with the host device cage 102 omitted. FIG. 2A is a top perspective view of the optoelectronic module 200 in a latched configuration. FIG. 2B is a bottom perspective view of the optoelectronic module 200 in the latched configuration. FIG. 2C is a top perspective view of the optoelectronic module 200 in an unlatched configuration. FIG. 2D is a bottom perspective view of the optoelectronic module 200 in the unlatched configuration. FIG. 2E is an exploded top perspective view of the optoelectronic module 200. FIG. 2F is an exploded bottom perspective view of the optoelectronic module 200.

With combined reference to FIGS. 2A-2F, the example optoelectronic module 200 includes a housing 206 that may include a bottom housing 208 and a top housing 210 fastened together. The top housing 210 may be removed from the bottom housing 208, e.g., to access an interior of the optoelectronic module 200. The housing 206 may at least partially surround receiver and/or transmitter circuitry, including a printed circuit board 270 (FIGS. 2B, 2D, and 2F) having an edge connector 272 configured to be electrically coupled to the host device. The bottom housing 208 and/or the top housing 210 may be die cast in zinc. Alternately or additionally, the bottom housing 208 and/or the top housing 210 may be die cast, or otherwise manufactured, from other suitable materials or a combination of other suitable materials.

2. Example Latching Mechanism

The optoelectronic module 200 includes a driver 212 and a follower 214. In some embodiments, the driver 212 and its features and/or the follower 214 and its features may be stamped from sheet metal. Alternately or additionally, the driver 212 the follower 214, and/or their features may be formed in other ways and/or from other materials, including, but not limited to, being molded from hard plastic.

The follower 214 is configured to be slidingly positioned relative to the housing 206. When the optoelectronic module 200 is in the latched configuration, the follower 214 is in a first position (or latched position) relative to the housing 206. When the optoelectronic module 200 is in the unlatched configuration, the follower 214 is in a second position (or unlatched position) relative to the housing 206. When in the latched position, the follower 214 may be positioned closer to the back (the edge connector 272 end) of the optoelectronic module 200 than when the follower 214 is in the unlatched position.

The follower 214 includes a pair of follower arms 232 that may be positioned on opposite sides of the housing 206. The follower arms 232 may fit at least partially within a pair of depressions 218 (shown in FIGS. 2E and 2F) located on opposite sides of the housing 206. In some embodiments, projections 240 (shown in FIGS. 2E and 2F) may be located on a top portion of the follower arms 232 and may be positioned within channels 230 (shown in FIGS. 2D and 2F) located on the top housing 210. Alternately or additionally, projections and channels analogous to the projections 240 and the channels 230 may be located, respectively, on a bottom portion of the follower arms 232 and the bottom housing 208.

The projections 240 and the channels 230 may encourage the follower arms 232 to remain at least partially positioned within the depressions 218 while the top housing 210 remains fastened to the bottom housing 208. For example, the projections 240 and the channels 230 may act to discourage the follower arms 232 from flexing away from the housing 206 while the top housing 210 remains fastened to the bottom housing 208. Alternately or additionally, the projections 240 and the channels 230 may form a pull stop and/or a push stop for the follower 214 such that the sliding movement of the follower 214 is arrested by the projections 240 contacting the ends of the channels 230 when the follower 214 reaches a latched position and/or an unlatched position. In some embodiments, the projections 240 and the channels 230 may act to encourage the follower 214 to remain on the housing 206 while the bottom housing 208 and the top housing 210 are fastened together. For example, the top housing 210 may be removed from the bottom housing 208 to allow the follower 214 to be removed from the housing 206.

With combined reference to FIG. 1 and FIGS. 2A-2F, the follower arms 232 may include recesses 234. The recesses 234 and the housing 206 are configured such that the cage latches 104 may fit at least partially within the recesses 234 when the optoelectronic module 200 is positioned within the host device cage 102 and when the optoelectronic module 200 is in the latched configuration.

The bottom housing 208 includes shoulders 216 adjacent to the recesses 234. The shoulders 216 are configured to at least partially abut the cage latches 104 when the cage latches 104 are at least partially within the recesses 234 and the depressions 218. When the optoelectronic module 200 is in the latched configuration, the engagement of the shoulders 216 with the cage latches 104 may prevent the optoelectronic module 200 from being removed from the host device cage 102 and/or from moving significantly within the host device cage 102. Thus, for example, the electrical connection between the optoelectronic module 200 and the host device 100 may be maintained and unintentional disconnection may be reduced and potentially eliminated.

The follower arms 232 include unlatch projections 236 that may extend beyond the shoulders 216 when the optoelectronic module 200 is in the latched configuration. The unlatch projections 236 may include ramped surfaces 238. When the optoelectronic module 200 is moved from the latched configuration to the unlatched configuration, the unlatch projections 236 and the ramped surfaces 238 urge the cage latches 104 out and beyond the shoulders 216 such that the optoelectronic module 200 may be removed from the host device cage 102.

Moving the optoelectronic module 200 from a latched configuration to an unlatched configuration is generally accomplished when the driver 212 is rotated from the latched position to the unlatched position. In the unlatched position, the driver 212 may also be used as a handle to pull the optoelectronic module 200 from the cage 102.

The optoelectronic module 200 may include a pair of posts 220 located on opposite sides of the housing 206. In some embodiments, the posts 220 may be formed as part of the bottom housing 208. The driver 212 may be positioned on the posts 220 such that the driver 212 rotates relative to the posts 220. The follower 214 may also be positioned on the posts 220 such that the follower 214 slides relative to the posts 220.

The follower 214 may include follower openings 246. The follower openings 246 may include horizontal portions 248 and vertical portions 250. The vertical portions 250 may enable the follower 214 to be positioned over the posts 220. For example, the vertical portions 250 may enable the follower 214 to be positioned on the bottom housing 208 during assembly. The horizontal portions 248 may be sized and shaped to enable the follower 214 to slide relative to the posts 220 during assembly and when the follower 214 moves between its latched position and its unlatched position. Alternately or additionally, the vertical portions 250 may interface with interfacing fingers 256 of the driver 212 such that the follower 214 is urged between its latched position and its unlatched position as the driver 212 is moved between its latched position and its unlatched position, as described in more detail below.

In some embodiments, the follower 214 may include fingers 242. The fingers 242 may be slidingly positioned on the housing 206, and may encourage the follower 214 to maintain its position relative to the housing 206. For example, the fingers 242 may encourage the follower 214 to maintain its orientation as the follower moves between its latched position and its unlatched position. The fingers 242 may be slidingly positioned on a top surface of the bottom housing 208. In some embodiments, chamfers 228 (shown in FIGS. 2A and 2E) may be formed on the bottom housing 208 to facilitate the positioning and/or movement of the fingers 242. For example, the chamfers 228 may be configured to accommodate a radius imparted on the fingers 242 by manufacturing processes or the like.

Optionally, the follower 214 may include tabs 244 (shown in FIGS. 2B, 2D, 2E, and 2F). The tabs 244 may be positioned at least partially within openings 247 (shown in FIGS. 2B, 2D, and 2F) formed in the bottom housing 208. The tabs 244 and the openings 247 may form a pull stop and/or a push stop for the follower 214 such that the sliding movement of the follower 214 is arrested by the tabs 244 contacting walls of the openings 247 when the follower 214 reaches particular positions, such as the latched position and/or the unlatched position.

Alternately or additionally, the tabs 244 may be configured to arrest the movement of the follower 214 and the driver 212 such that the follower 214 and the driver 212 are encouraged to remain positioned on the housing 206. In some embodiments, the tabs 244 may be coplanar before the follower 214, the driver 212, and the housing 208 are assembled. The tabs 244 may be deformed such that the tabs 244 are positioned within the openings 247 after the follower 214, the driver 212, and the housing 208 are assembled, as described in additional detail below.

In some embodiments, the posts 220 may each include a partially cylindrical portion including a flat surface 222. The posts 220 may present a narrower profile when viewed parallel to the flat surface 222 relative to the profile when viewed perpendicular to the flat surface 222. Alternately or additionally, the posts 220 may each include a flange 224.

The driver 212 includes a pair of driver arms 213 that may be positioned on opposite sides of the housing 206. Each of the driver arms 213 may include a driver opening 258. Each driver opening 258 may include a slot portion 260 and a rounded portion 262. In some embodiments, the rounded portion 262 may be wider than the slot portion 260.

The posts 220 and the driver openings 258 may be configured such that the posts 220 may slide into the driver openings 258 via the slot portions 260 and into the rounded portions 262. Once the posts 220 are positioned in the rounded portions 262, the driver 212 may be allowed to rotate relative to the posts 220. In some embodiments, the slot portions 260 may be sized to accept the posts 220 when aligned with, or oriented in substantially the same direction as, the flat surface 222. Alternately or additionally, the slot portions 260 may be sized not to accept the posts 220 when not aligned with, or not oriented in substantially the same direction as, the flat surface 222. Put another way, the slot portions may be configured to fit over the narrow profile of the posts 220, but not over a broad profile of the posts 220. The flanges 224 may keep the driver openings 258 from sliding off of the posts 220 in a longitudinal direction of the posts 220.

In some embodiments, the posts 220 and the driver openings 258 may be configured such that the posts 220 may not slide through the slot portions 260 while the optoelectronic module 200 is in the latched configuration, the unlatched configuration, and/or at a configuration between the latched and unlatched configurations. In some embodiments, the driver 212 may not reach a position where the slot portions 260 fit over the posts 220 when the optoelectronic module 200 is in the latched configuration, when in the unlatched configuration, and/or while traveling between the latched and unlatched configurations. For example, the driver 212 may be configured to fit over the posts 220 when oriented in a manner achievable during assembly, but unachievable while the optoelectronic module 200 is in an assembled state.

The driver arms 213 may each include an interfacing finger 256. In some embodiments, the interfacing fingers 256 may fit within channels 226 formed in the bottom shell 208. The channels 226 may be shaped such that the interfacing fingers 256 may move within the channels 226 as the driver 212 is positioned on the posts 220 during assembly and as the driver 212 is rotated between the latched position and the unlatched position.

In response to the driver 212 being rotated to its latched position, the follower 214 may be urged to its latched position. In response to the driver 212 being rotated to its unlatched position, the follower 214 may be urged to its unlatched position. For example, the interfacing fingers 256 may move along a curved path corresponding to the curved portion of the channels 226 of the bottom housing 208. As the fingers 256 are positioned closer to the back of the optoelectronic module 200 when rotating the driver 212 to its latched position, the fingers 256 may contact the back walls of the vertical portions 250 of the openings 246 and urge the follower 214 to its latched position. Conversely, as the fingers 256 are positioned closer to the front of the optoelectronic module 200 when rotating the driver 212 to its unlatched position, the fingers 256 may contact the front walls of the vertical portions 250 of the openings 246 and urge the follower 214 to its unlatched position.

The sliding of the follower 214 to its unlatched position causes the cage latches 104 of the cage to slide along ramped surfaces 238, urging the cage latches 104 away from the center of the cage until they are located on the unlatch projections 236. The configuration of the unlatch projections 236 causes the cage latches 104 to no longer abut the shoulders 216, thus allowing the optoelectronic module 200 to be removed from the cage unhindered by the cage latches 104.

In some embodiments, the driver 212 and the follower 214 may be configured to form a detent. In some embodiments, the driver 212 may include detent projections 254 and/or the follower 214 may include detent protuberances 252. The detent projections 254 may be resiliently deformed by the detent protuberances 252 as the detent projections 254 move over the detent protuberances 252. Thus, for example, the detent projections 254 and the detent protuberances 252 may create a resistance to be overcome to rotate the driver 212 from the latched position to the unlatched position. The detent projections 254 and the detent protuberances 252 may alternately or additionally create a resistance to be overcome to rotate the driver 212 from the unlatched position to the latched position such that a feedback sensation is generated of the driver 212 firmly settling into the latched position. In some embodiments, a single detent projection 254 and a single detent protuberance 252 may be employed.

Assembly of the optoelectronic module 200 may include positioning the follower 214 with the tabs 244 in a coplanar position on the bottom housing 208 by sliding the posts 220 of the bottom housing 208 into the vertical portions 250 of the openings 246. The follower arms 232 may be flexed away from one another as the posts 220 slide into the openings 246 so that the follower arms 232 clear the bottom housing 208 until the follower arms 232 may be positioned in the depressions 218 of the bottom housing 208. The fingers 242, the openings 246, and the posts 220 may be located such that the fingers 242 may slide past the front of the bottom housing 208 during assembly.

With the follower 214 positioned such that the vertical portions 250 of the openings 246 are aligned with the uppermost portion of the channels 226 of the bottom housing 208, the driver 212 may be positioned on the bottom housing 208 and follower 214 by sliding the posts 220 into the slot portions 260 of the driver openings 258 and sliding the interfacing fingers 256 into the aligned vertical portions 250 of the openings 246 and the channels 226.

After the posts 220 have reached the rounded portions 262 of the driver openings 258, the driver 212 and the follower 214 may be moved to the unlatched position, the latched position, or a position between the unlatched position and latched position (hereinafter an "operating position") from an assembly position. The tabs 244 may be deformed to be located within the openings 247 of the bottom housing 208. The tabs 244 and the openings 247 may restrict movement of the follower 214 such that the driver 212 and the follower are discouraged from moving back to their assembly position. Alternately or additionally, the top housing 210 may be fastened to the bottom housing 208 such that the projections 240 are at least partially positioned within the channels 230. The projections 240 and the channels 230 may restrict movement of the follower 214 such that the driver 212 and the follower are discouraged from moving back to their assembly position.

The present invention may be embodied in other specific forms without departing from its spirit or essential characteristics. The described embodiments are to be considered in all respects only as illustrative and not restrictive.

What is claimed is:

1. A latch comprising:
a follower including a follower opening configured to receive a post of a housing: the post of the housing including a partially cylindrical portion including a flat surface and a flange configured to maintain a driver on the post; and
the driver including: a driver opening including a slot portion and a rounded portion wider than the slot portion, the driver opening configured to receive the post of the housing such that the driver is selectively rotatable relative to the post, the slot portion sized to receive the partially cylindrical portion of the post when in an aligned orientation relative to the flat surface and not to receive the partially cylindrical portion of the post when not in the aligned orientation relative to the flat surface; and
an interfacing finger positioned to be received by the follower opening, wherein the interfacing finger is configured to urge the follower to slidingly move relative to the housing as the driver is rotated relative to the post.

2. The latch of claim 1, wherein the interfacing finger is further configured to be received by a channel of the housing.

3. The latch of claim 1, wherein the follower opening includes a vertical portion configured to receive the interfacing finger.

4. The latch of claim 1, wherein the follower opening includes a horizontal portion configured to slidingly receive the post.

5. The latch of claim 1, further comprising a detent including a detent projection on the driver and a detent protuberance on the follower.

6. The latch of claim 1, wherein the follower further includes a finger configured to be slidingly positioned on the housing.

7. The latch of claim 1, wherein the follower includes a tab configured to be received by an opening in the housing.

8. The latch of claim 1, wherein the follower includes a follower arm configured to be at least partially received within a depression of the housing, the follower arm including an unlatch projection.

9. A module comprising:
a housing including a post including a partially cylindrical portion including a flat surface and a flange configured to maintain a driver on the post;
a follower including a follower opening shaped to slide relative to the post as the follower slides relative to the housing; and
the driver including: a driver opening including a slot portion and a rounded portion wider than the slot portion, the driver opening shaped to rotate relative to the post as the driver is rotated between a latched position and an unlatched position, the slot portion sized to receive the partially cylindrical portion of the post when in an aligned orientation relative to the flat surface and not to receive the partially cylindrical portion of the post when not in the aligned orientation relative to the flat surface; and
an interfacing finger positioned to be received by the follower opening, wherein the interfacing finger is configured to: urge the follower to a latched position relative to the housing as the driver is rotated from the unlatched position to the latched position, and urge the follower to an unlatched position relative to the housing as the driver is rotated from the latched position to the unlatched position.

10. The module of claim 9, wherein the housing further includes a channel configured to receive the interfacing finger of the driver.

11. The module of claim 9, wherein the follower opening includes a vertical portion configured to receive the interfacing finger.

12. The module of claim 9, wherein the follower opening includes a horizontal portion configured to slidingly receive the post.

13. The module of claim 9, further comprising a detent including a detent projection on the driver and a detent protuberance on the follower.

14. The module of claim 9, wherein the follower further includes fingers configured to be slidingly positioned on the housing.

15. The module of claim 9, wherein the follower further includes a tab and the housing further includes an opening configured to receive the tab.

16. The module of claim 9, wherein the follower further includes a follower arm configured to be at least partially received within a depression of the housing, the follower arm including an unlatch projection.

17. A module comprising:
a housing including: posts, each including: a partially cylindrical portion including a flat surface; and a flange configured to maintain a driver on the posts; channels; and depressions;
a follower including: follower arms, each including an unlatch projection;
follower openings sized and positioned to receive the posts of the housing and to slide relative to the posts as the follower slides relative to the housing; and a detent protuberance; and
the driver including:
driver arms including driver openings, each of the driver openings including a slot portion and a rounded portion wider than the slot portion, the slot portions being configured to receive the partially cylindrical portion of the posts when in an aligned orientation relative to the flat surface and being configured not to receive the partially cylindrical portion of the posts when not in the aligned orientation relative to the flat surface, the driver openings sized and positioned to: receive the posts; and rotate relative to the posts as the driver is rotated between a latched position and an unlatched position;
interfacing fingers positioned to be received by the follower openings of the follower and the channels of the housing; and a detent projection, wherein the interfacing fingers are sized and positioned to:
urge the follower to a latched position relative to the housing as the driver is rotated from its unlatched position to its latched position; and
urge the follower to an unlatched position relative to the housing as the driver is rotated from its latched position to its unlatched position; and wherein the detent projection and the detent protuberance are positioned such that the detent projection is resiliently deformed to create a resistance to be overcome to rotate the driver from the latched position to the unlatched position.

18. The module of claim 17, wherein:
the follower further includes:
fingers configured to be slidingly positioned on the housing; and tabs;

the housing further includes openings configured to receive the tabs of the follower; and the follower openings each include:
  a vertical portion configured to receive the interfacing fingers; and
  a horizontal portion configured to slidingly receive the posts.

* * * * *